(12) United States Patent
Ewanchuk et al.

(10) Patent No.: US 9,250,713 B2
(45) Date of Patent: Feb. 2, 2016

(54) CONTROL EXPOSURE

(75) Inventors: Brian J. Ewanchuk, Redmond, WA (US); Lawrence W. Olson, Redmond, WA (US); Michael J. Hillberg, Beaux Arts, WA (US); Akhilesh Kaza, Sammamish, WA (US); Jeremy B. Gup, Seattle, WA (US); Austin M. Lamb, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 61 days.

(21) Appl. No.: 13/410,888

(22) Filed: Mar. 2, 2012

(65) Prior Publication Data

US 2013/0145380 A1    Jun. 6, 2013

Related U.S. Application Data

(60) Provisional application No. 61/567,026, filed on Dec. 5, 2011.

(51) Int. Cl.
*G06F 3/00* (2006.01)
*G06F 9/44* (2006.01)
*G06F 9/46* (2006.01)
*G06F 13/00* (2006.01)
*G06F 3/03* (2006.01)
*G06F 3/01* (2006.01)

(52) U.S. Cl.
CPC ............. *G06F 3/0304* (2013.01); *G06F 3/017* (2013.01); *G06F 2203/0381* (2013.01)

(58) Field of Classification Search
CPC ............................ G06F 9/542; G06F 3/0304

USPC ......................................................... 719/318
See application file for complete search history.

(56) References Cited

U.S. PATENT DOCUMENTS

| 6,002,808 | A  | * | 12/1999 | Freeman | 382/288 |
|---|---|---|---|---|---|
| 6,396,476 | B1 |   | 5/2002 | Bradski et al. | |
| 2004/0193413 | A1 |   | 9/2004 | Wilson et al. | |
| 2007/0259717 | A1 | * | 11/2007 | Mattice et al. | 463/36 |
| 2010/0100891 | A1 |   | 4/2010 | Boeckenhauer et al. | |
| 2010/0123664 | A1 | * | 5/2010 | Shin et al. | 345/169 |
| 2010/0188328 | A1 | * | 7/2010 | Dodge et al. | 345/156 |

(Continued)

FOREIGN PATENT DOCUMENTS

| CN | 101681199 | 3/2010 |
|---|---|---|
| CN | 101840299 | 9/2010 |

(Continued)

OTHER PUBLICATIONS

"International Search Report", Mail Date: Mar. 15, 2013, Application No. PCT/US2012/066913, Filed date: Nov. 29, 2012, pp. 8.

(Continued)

*Primary Examiner* — Timothy A Mudrick
(74) *Attorney, Agent, or Firm* — Aaron Chatterjee; Raghu Chinagudabha; Micky Minhas (57) ABSTRACT

Control exposure techniques are described. In one or more implementations, a determination is made by a computing device as to which of a plurality of controls correspond to one or more inputs detected using one or more magnetometers, cameras, or microphones. A result of the determination is exposed by the computing device to one or more applications that are executed by the computing device.

14 Claims, 6 Drawing Sheets

(56) References Cited

U.S. PATENT DOCUMENTS

| | | | |
|---|---|---|---|
| 2010/0208038 A1* | 8/2010 | Kutliroff et al. | 348/46 |
| 2010/0271302 A1* | 10/2010 | Pering et al. | 345/161 |
| 2010/0295783 A1* | 11/2010 | El Dokor et al. | 345/158 |
| 2011/0001699 A1 | 1/2011 | Jacobsen et al. | |
| 2011/0242134 A1* | 10/2011 | Miller et al. | 345/633 |

FOREIGN PATENT DOCUMENTS

| | | |
|---|---|---|
| KR | 1020040104011 A | 12/2004 |
| KR | 1020090126937 A | 12/2009 |

OTHER PUBLICATIONS

Bai, Gang, "Mobile Phone Programming—Based on Mobile Sensor API for User Interface", Retrieved at <<https://publications.theseus.fi/bitstream/handle/10024/14108/Bai_Gang.pdf>>, May 10, 2010, pp. 75.

Apaydin, Ozan, "Networked Humanoid Animation Driven by Human Voice using Extensible 3D (X3), H-ANIM and Java Speech Open Standards", Retrieved at <<http://citeseerx.ist.psu.edu/viewdoc/download?doi=10.1.1.198.8088&rep=rep1&type=pdf>>, Mar. 2002,pp. 102.

Griffiths, Lawrie, "Trail: Vision", Retrieved at <<http://lejos.sourceforge.net/tutorial/vision/index.html>>, Aug. 8, 2011, pp. 4.

D'Souza, et al., "Kinect to Architecture", Retrieved at <<http://www.ivs.auckland.ac.nz/ivcrnz2011_temp/uploads/1543/2-Kinect_to_Architecture_v2.pdf>>, Retrieved Date: Jan. 5, 2012, pp. 6.

Greene, Jay, "Microsoft Advances Natural UI with Kinect SDK", Retrieved at <<http://news.cnet.com/8301-10805_3-20071613-75/microsoft-advances-natural-ui-with-kinect-sdk/>>, Jun. 16, 2011, pp. 3.

Chen, Clare, "Motion Sensing Technology", Retrieved at <<http://www.pickar.caltech.edu/e103/Final%20Exams/Motion%20Sensing%20Technology.pdf>>, Jun. 2, 2011, pp. 36.

"Extended European Search Report", EP Application No. 12855728.7, Mar. 31, 2015, 3 pages.

"Foreign Office Action", CN Application No. 201210514095.X, Apr. 30, 2015, 14 Pages.

"Foreign Office Action", EP Application No. 12855728.7, Apr. 20, 2015, 5 pages.

\* cited by examiner

```
                    ┌──────────────────────────────────────────────┐
                    │                    402                        │
                    │ Determine, by a computing device, which of a  │
                    │ plurality of controls correspond to one or    │
                    │ more inputs detected using one or more        │
                    │ magnetometers, cameras, or microphones        │
                    └──────────────────────┬───────────────────────┘
                                           │
                                           ▼
                    ┌──────────────────────────────────────────────┐
                    │                    404                        │
                    │ Expose a result of the determination by the   │
                    │ computing device to one or more applications  │
                    │ that are executed by the computing device     │
                    └──────────────────────────────────────────────┘
```

CONTROL EXPOSURE

RELATED APPLICATIONS

This application claims priority under 35 U.S.C. Section 119(e) to U.S. Provisional Application No. 61/567,026, filed Dec. 5, 2011, and titled "Extensible Model to Control UI with Voice or Motion Sensors," the entire disclosure of which is hereby incorporated by reference.

BACKGROUND

The way in which users are able to interact with a computing device is ever increasing. For example, interaction with a computing device was initially performed using text. Therefore, a user typically entered the text using a keyboard and viewed an output by the computing device that was also in text.

These techniques were then expanded into graphical user interfaces in which a user could interact with a cursor control device, such as a mouse. The techniques continued to expand as graphical user interfaces were configured to recognize gestures made by a user to provide inputs to the computing device. For example, gestures may be used to select objects, interact with a video game, and so on. However, these techniques conventionally relied on operations that were performed by an application itself, such as to recognize which motions corresponded to which gestures, and thus may complicate coding of the application by application developers.

SUMMARY

Control exposure techniques are described. In one or more implementations, a determination is made by a computing device as to which of a plurality of controls correspond to one or more inputs detected using one or more magnetometers, cameras, or microphones. A result of the determination is exposed by the computing device to one or more applications that are executed by the computing device.

In one or more implementations, a system is implemented by a computing device. The system includes one or more applications that are executable on hardware of the computing device and a module that is implemented at least partially using the hardware of the computing device. The module is configured to receive one or more inputs that describe user interaction that is detected without using touch, determine which of the one or more applications are a target of the one or more inputs, convert the one or more inputs into events that are consumable by the targeted applications, and expose the events to the targeted applications.

In one or more implementations, one or more computer-readable storage media comprise instructions stored thereon that, responsive to execution by a computing device, causes the computing device to implement an operating system configured to expose one or more events via an application programming interface for one or more controls identified by the operating system from inputs received from one or more cameras of the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Input techniques that may be utilized to interact with a computing device have evolved from text input techniques typically implemented using a keyboard to gestures that may be captured using a camera. However, conventional techniques relied on the applications themselves to recognize the gestures and thus were not extensible, could result in duplicative coding across applications, and so forth.

Control exposure techniques are described. In one or more implementations, a module may be incorporated as part of an operating system of a computing device. The module may be configured to process inputs. The inputs may originate from a variety of input devices, such as magnetometers, cameras, microphones, and so on. Thus, in some instances these inputs may be used to support a natural user interface that does not involve touch. The inputs may be processed by the module for exposure to applications of the computing device, such as events, as associated with one or more controls, and so on. This may be used to support an extensible system, and may do so while maintaining system consistency, e.g., extensible in such a manner that the user experience is not compromised. Thus, the module may provide this functionality to applications without the applications "having to know" how these events and/or controls were implemented, further discussion of which may be found in relation to the following figures.

In the following discussion, an example environment is first described that is operable to employ the described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

Figure 1:
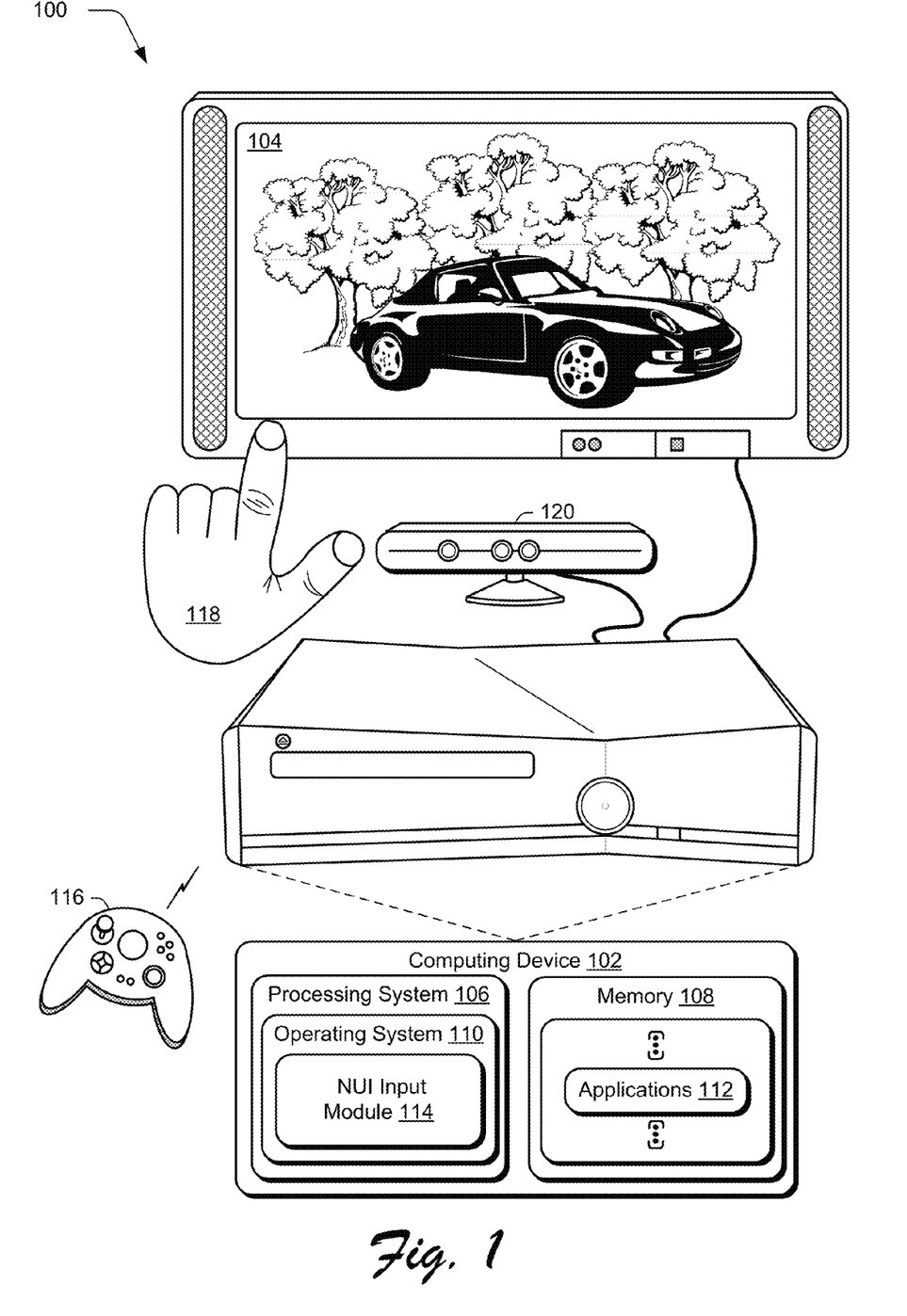
FIG. 1 is an illustration of an environment in an example implementation that is operable to employ techniques described herein.

FIG. 1 is an illustration of an environment 100 in an example implementation that is operable to employ techniques described herein. The illustrated environment 100 includes an example of a computing device 102, which is illustrated as a game console that is communicatively coupled to a display device 104 (e.g., a television) but may be configured in a variety of other ways. For example, the computing device 102 may be configured as a traditional computer (e.g., a desktop personal computer, laptop computer, and so on), a mobile station, an entertainment appliance, a wireless phone, a tablet, a netbook, and so forth as further described in relation to FIG. 6. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is also illustrated as including a processing system 106 and an example of computer-readable storage media, which in this instance is memory 108. The processing system 106 is not limited by the materials from which they are formed or the processing mechanisms employed therein. For example, the processing system 106 may be comprised of semiconductor(s) and/or transistors (e.g., electronic integrated circuits (ICs)), such as a system on a chip, CPUs, functional blocks, and so on. In such a context, executable instructions may be electronically-executable instructions. Alternatively, the mechanisms of or for processing system 106, and thus of or for a computing device, may include, but are not limited to, quantum computing, optical computing, mechanical computing (e.g., using nanotechnology), and so forth. Additionally, although a single memory 108 is shown, a wide variety of types and combinations of memory may be employed, such as random access memory (RAM), hard disk memory, removable medium memory, and other types of computer-readable media.

The computing device 102 is further illustrated as including an operating system 110. The operating system 110 is configured to abstract underlying functionality of the computing device 102 to applications 112 that are executable on the computing device 102. For example, the operating system 110 may abstract the processing system 106, memory 108, network, input/output, and/or display functionality of the computing device 102 such that the applications 112 may be written without knowing "how" this underlying functionality is implemented. The application 112, for instance, may provide data to the operating system 110 to be rendered and displayed by the display device 104 without understanding how this rendering will be performed. The operating system 108 may also represent a variety of other functionality, such as to manage a file system and user interface that is navigable by a user of the computing device 102.

The operating system 108 is also illustrated as including a NUI input module 114, which may be included as part of input/output functionality supported by the operating system 110. Thus, the NUI input module 114 is representative of functionality relating to recognition of inputs and/or provision of outputs by the computing device 102. For example, the NUI input module 114 may be configured to identify gestures and cause operations to be performed that correspond to the gestures, and so on. The inputs may be detected for processing by the NUI input module 114 in a variety of different ways.

For example, the operating system 110 may be configured to receive one or more inputs via touch interaction with a hardware device, such as a controller 116 as illustrated. Touch interaction may involve pressing a button, moving a joystick, movement across a track pad, use of a touch screen of the display device 104 (e.g., detection of a finger of a user's hand 118 or a stylus), and so on. Recognition of the touch inputs may be leveraged by the operating system 110 to interact with a user interface output by the computing device 102, such as to interact with a game, an application, browse the internet, change one or more settings of the computing device 102, and so forth. A variety of other hardware devices are also contemplated that involve touch interaction with the device. Examples of such hardware devices include a cursor control device (e.g., a mouse), a remote control (e.g. a television remote control), a mobile communication device (e.g., a wireless phone configured to control one or more operations of the computing device 102), and other devices that involve touch on the part of a user or object.

The NUI input module 114 may be leveraged by the operating system 110 to support a natural user interface (NUI) that may recognize interactions that may not involve touch. For example, the computing device 102 may include a NUI input device 120. The NUI input device 120 may be configured in a variety of ways to detect inputs without having a user touch a particular device, such as to recognize audio inputs through use of a microphone. For instance, the NUI input module 114 may be configured to perform voice recognition to recognize particular utterances (e.g., a spoken command) as well as to recognize a particular user that provided the utterances.

In another example, the NUI input device 120 that may be configured to support recognition of gestures, presented objects, images, and so on through use of a camera. The camera, for instance, may be configured to include multiple lenses so that different perspectives may be captured and thus determine depth. The different perspectives, for instance, may be used to determine a relative distance from the NUI input device 120 and thus a change in the relative distance. The different perspectives may be leveraged by the NUI input module 114 as depth perception. The images may also be leveraged by the NUI input module 114 to provide a variety of other functionality, such as techniques to identify particular users (e.g., through facial recognition), objects, and so on.

The NUI input module 114 may leverage the NUI input device 120 to perform skeletal mapping along with feature extraction of particular points of a human body (e.g., 48 skeletal points) to track one or more users (e.g., four users simultaneously) to perform motion analysis. For instance, the NUI input device 120 may capture images that are analyzed by the NUI input module 114 to recognize one or more motions made by a user, including what body part is used to make the motion as well as which user made the motion. An example is illustrated through recognition of positioning and movement of one or more fingers of a user's hand 118 and/or movement of the user's hand 118 as a whole. The motions may be identified as gestures by the NUI input module 114 to initiate a corresponding operation.

A variety of different types of gestures may be recognized, such a gestures that are recognized from a single type of input (e.g., a motion gesture) as well as gestures involving multiple types of inputs, e.g., a motion gesture and an object gesture made using an object. Thus, the NUI input module 114 may support a variety of different gesture techniques by recognizing and leveraging a division between inputs. It should be noted that by differentiating between inputs in the natural user interface (NUI), the number of gestures that are made possible by each of these inputs alone is also increased. For example, although the movements may be the same, different gestures (or different parameters to analogous commands) may be indicated using different types of inputs. Thus, the NUI input module 114 may provide a natural user interface that supports a variety of user interaction's that do not involve touch.

Accordingly, although the following discussion may describe specific examples of inputs, in instances different types of inputs may also be used without departing from the spirit and scope thereof. Further, although in instances in the following discussion the gestures are illustrated as being input using a NUI, the gestures may be input using a variety of different techniques by a variety of different devices, such as to employ touchscreen functionality of a tablet computer.

In one or more implementations, the NUI input module 114 may be configured to expose a result of processing of inputs received from the NUI input device 120 for consumption by the one or more applications 112. Thus, in this example a developer of the applications 112 may access leverage this functionality without specifically encoding this processing as part of the application 112 itself. Further discussion of exposure of this functionality by the NUI input module 114 may be found in relation to the following figure.

Figure 2:
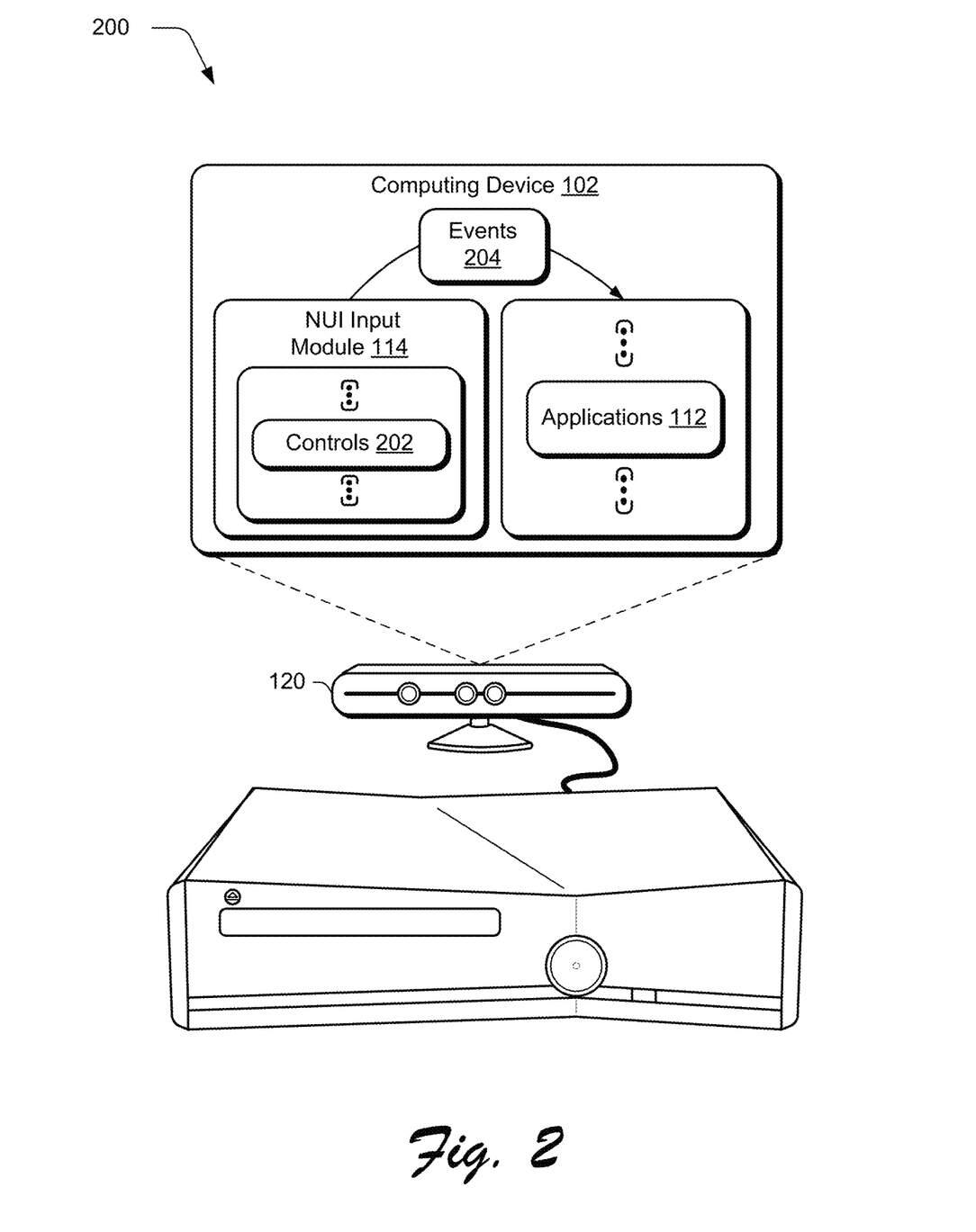
FIG. 2 illustrates an example system communication between a NUI input module and applications of FIG. 1.

FIG. 2 depicts a system 200 in an example implementation showing communication between the NUI input module 114 and the applications 112. In this example, the NUI input module 114 follows a third party extensibility model to integrate sensors, such as from the NUI input module 120 (e.g., voice and images) as a main stream paradigm for building a NUI for use by one or more applications 112.

As part of this, the NUI input module 114 may provide controls 202 that are usable by the applications 112. The controls 202, for instance, may support a default set of commonly used paradigms that involve canned behaviors, examples of which include magnetism, motion data, voice commands, and so forth. The NUI input module 114 may also follow a programming model that supports third party scalability along with algorithms for magnetism and data structures that may be exposed to support extensibility for third parties, e.g., the applications 112.

In one or more implementations, the NUI input module 114 is configured to receive inputs from one or more input devices, such as cameras and/or microphones of the NUI input module 120 as previously described. The NUI input module 114 may then produce a set of events 204 to which the applications 112 may subscribe. The events 204, for instance, may pertain to motion detected using a camera, voice detected using a microphone, magnetometer, or other sensors of the computing device 102.

For example, the operating system 110 may route these inputs to the NUI input module 114. The NUI input module 114 may then determine a current state of one or more of the applications 112, e.g., is the application currently being executed, "listening" for events 204, and so on. From this state, the NUI input module 114 may determine a target of the inputs, and therefore convert the inputs to be compatible with the target, e.g., one or more of the applications 112.

These inputs may then be exposed to the applications 112 in a variety of ways, such as associated with a particular one of the controls 202, as events 204, via an application programming interface, as commands, and so on. The events 204, for instance, may be configured as specific to the NUI input device 120, as keyboard events (e.g., such that a NUI input gesture is converted to a keyboard input), and so forth.

To determine how the inputs are to be converted for compatibility with the applications 112, the NUI input module 114 may perform one or more handshaking operations with the applications 112. For example, the NUI input module 114 may perform a handshake with a runtime in question with respect to application state to negotiate a result that is compatible with the applications 112. Examples of data points that may be used relate to magnetism, focus, pre-defined gestures, application state, and so on.

Figure 3:
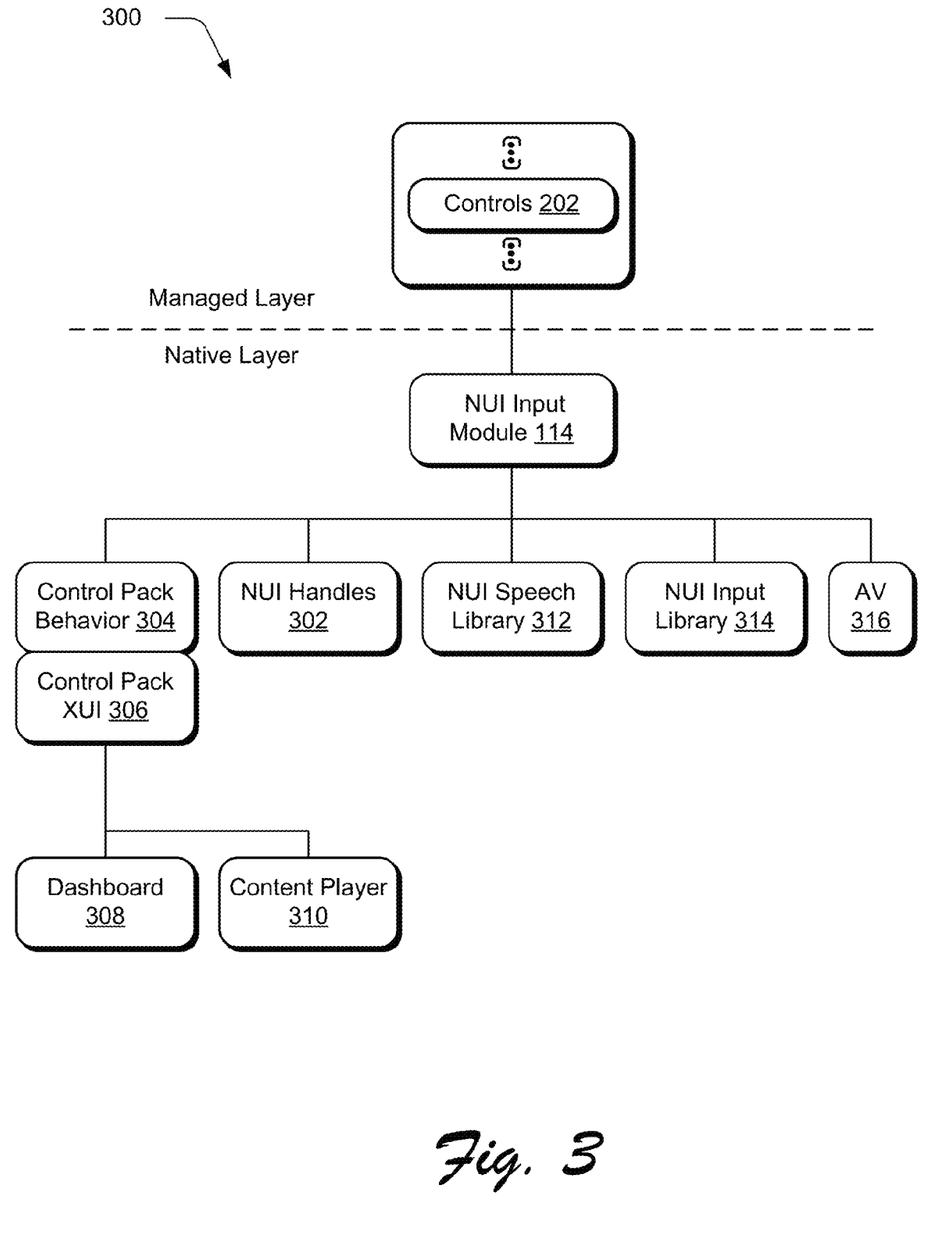
FIG. 3 depicts a system in an example implementation of a NUI input module of FIG. 2 as exposing controls to a managed layer from a native layer.

FIG. 3 depicts a system 300 in an example implementation of the NUI input module 114 as exposing controls to a managed layer from a native layer. Although native and managed are described in this example, it should be readily apparent that a variety of other non-managed implementations are also contemplated. As illustrated, the NUI input module 114 is illustrated as operating within a native layer and exposing controls 202 via a managed layer for consumption by a target, such as the applications 112. The NUI input module 114 is illustrated as leveraging a variety of functionality of the computing device 102 to receive inputs, determine a target for those inputs, and expose a result as previously described.

For example, the NUI input module 114 may leverage NUI handles 302, control pack behavior 304, and a control pack experience user interface (XUI) 306, which itself employs a dashboard 308 and content player 310. These modules may be thought of as part of a living room experience. The NUI input module 114 may also include modules that are used for a basis of the determination as well as a source of the inputs, examples of which are illustrated as a NUI speech library 312, a NUI input library 314, and audio/visual (AV) 316. Thus, the NUI input module 114 may use these modules to look at a current state of an application runtime, determine a target of the input, and convert it into a paradigm that is exposed on the public surface via the controls 202, such as through use of new (e.g., motion based) or legacy (e.g., keyboard) events.

There are a variety of different modes of programmability supported by the NUI input module 114. In a first mode, the NUI input module 114 may output a raw stream that is not processed by the NUI input module 114, and thus application developers may use this raw stream to develop operations (e.g., gestures) that are not otherwise supported by the NUI input module 114. A second mode is used to support controls 202 and the layout thereof in a user interface. This mode may include "baked in" behaviors and/or may be built into the applications 112 based on design specifications supported by the NUI input module 114. Further, the NUI input module 114 may support heuristics to determine how to configure a result computed by the NUI input module 114 for consumption by a target. As previously described, this may involve a handshake between the application runtime in question to negotiate "how" the result is to be output.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200-300 of FIGS. 2 and 3.

Figure 4:
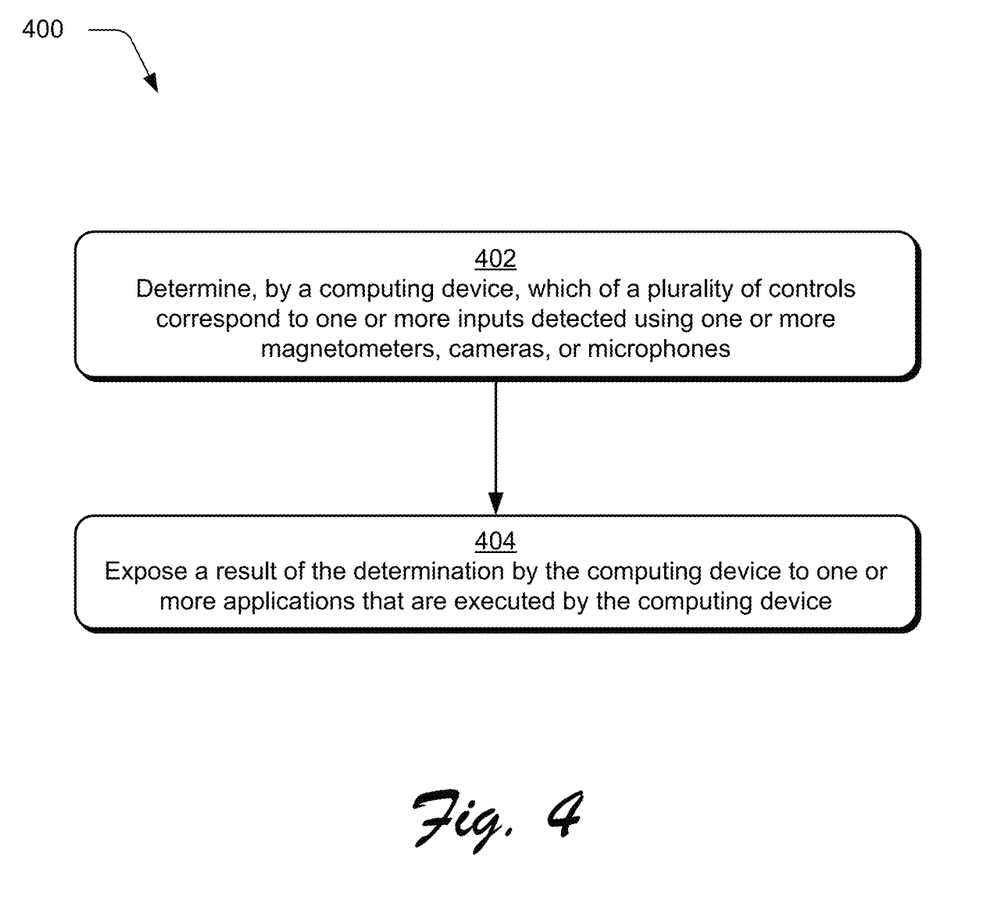
FIG. 4 is a flow diagram depicting a procedure in an example implementation in which a determination is made as to which of a plurality of controls correspond to one or more inputs, a result of the determination being exposed to applications.

FIG. 4 depicts a procedure 400 in an example implementation in which a determination is made as to which of a plurality of controls correspond to one or more inputs, a result of the determination being exposed to applications. A determination is made by a computing device as to which of a plurality of controls correspond to one or more inputs detected using one or more magnetometers, cameras, or microphones (block 402). The NUI input module 114, for instance, may receive inputs that from the magnetometers, cameras, or microphones. The NUI input module 114 may then determine which controls 202 correspond to these inputs. These inputs may by used in conjunction with a variety of different types of controls, such as controls output as part of a graphical user interface, to initiate one or more operations of the computing device 102 (e.g., through interaction with the application 112), and so on.

A result of the determination is exposed by the computing device to one or more applications that are executed by the computing device (block 404). The result, for instance, may identify the control as well as an operation to be performed, e.g., a press of a particular button, movement of a slider control, panning, selection of content, a "cut and paste," and so forth. Thus, the NUI input module 114 may expose a variety of functionality such that a developer of the applications 112 may efficiently leverage this functionality. A variety of other examples are also contemplated.

Figure 5:
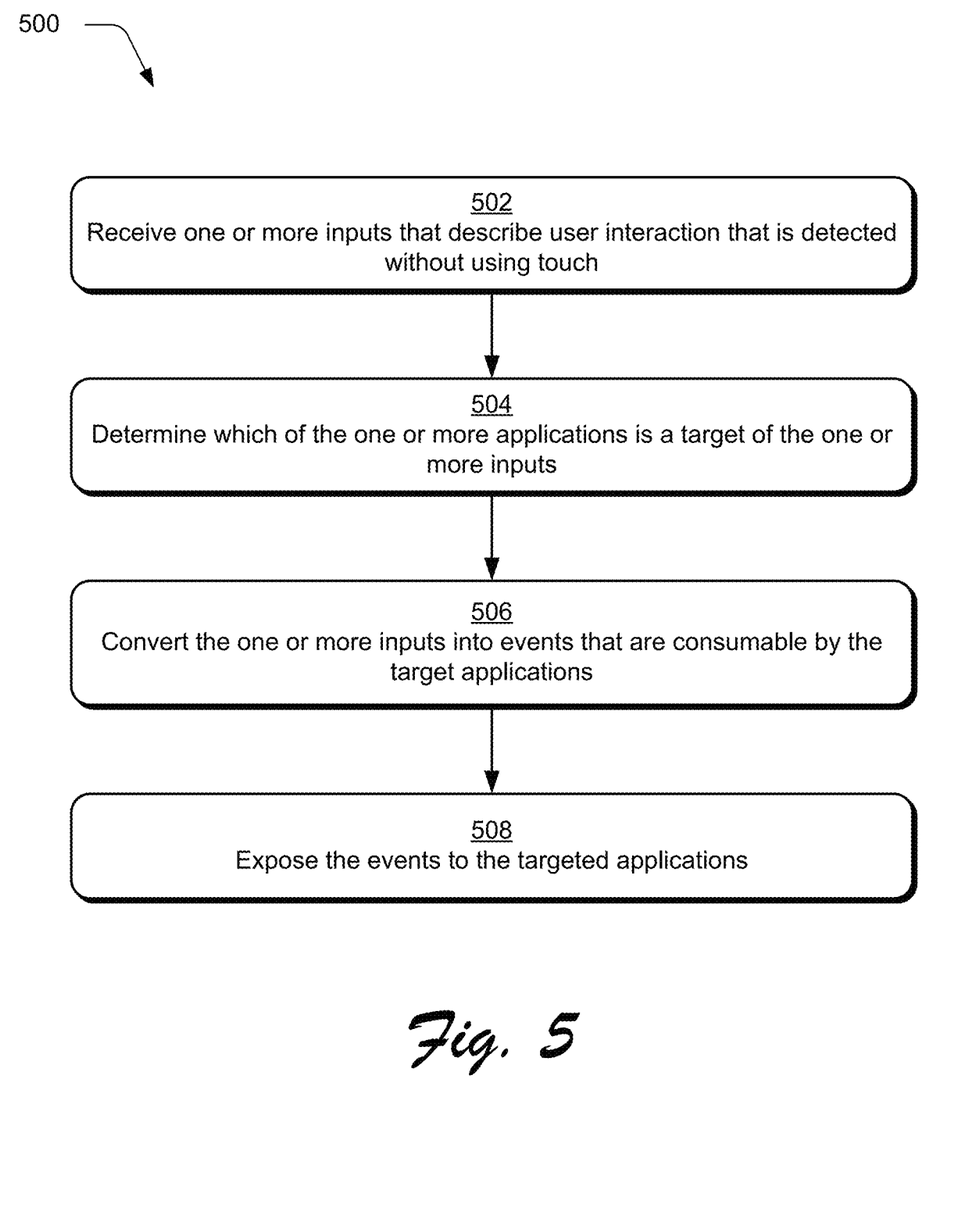
FIG. 5 is a flow diagram depicting a procedure in an example implementation in which events are exposed to applications that are a target of one or more inputs that are detected without using touch.

FIG. 5 depicts a procedure 500 in an example implementation in which events are exposed to applications that are a target of one or more inputs that are detected without using touch. One or more inputs are received that describe user interaction that is detected without using touch (block 502). The user inputs, for instance, may be detected using a camera (e.g., depth sensing camera) or microphone as part of the NUI input device 120. A variety of other examples are also contemplated, such as to detect an orientation of the computing device 102 (e.g., magnetometers), and so forth.

A determination is made as to which of the one or more applications are targeted by the one or more inputs (block 504). As previously described, the NUI input module 114 may perform a "handshake" to determine a state of the applications 112 and thus determine which applications 112 are available to receive events 202, what events the applications 112 are "looking for," and so forth.

The one or more inputs are converted into events that are consumable by the targeted applications (block 506). Continuing with the previous example, the NUI input module 114 may use a result of the handshake to determine how to expose the one or more inputs 202, e.g., which events 204, controls 202, and so forth are supported by the applications 112. The events are then exposed to the targeted applications (block 508), e.g., via an application programming interface. A variety of other examples are also contemplated as previously described.

Example System and Device

Figure 6:
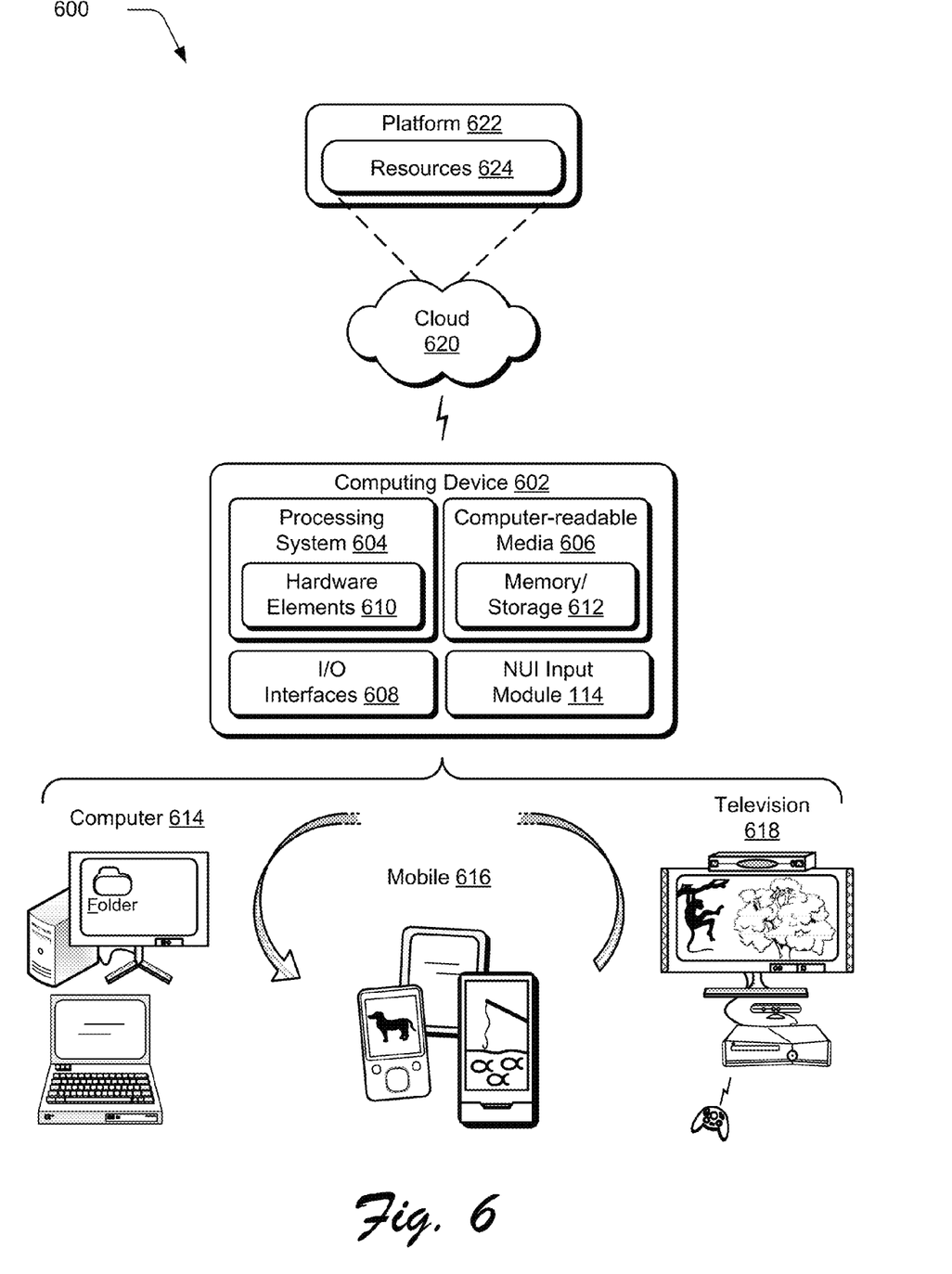
FIG. 6 illustrates various components of an example device that can be implemented as any type of portable and/or computer device as described with reference to FIGS. 1-3 to implement embodiments of the techniques described herein.

FIG. 6 illustrates an example system generally at 600 that includes an example computing device 602 that is representative of one or more computing systems and/or devices that may implement the various techniques described herein. The computing device 602 may be, for example, a server of a service provider, a device associated with a client (e.g., a client device), an on-chip system, and/or any other suitable computing device or computing system. The NUI input module 114 is illustrated as part of the computing device 102 to illustrate that this functionality may be incorporated in a wide variety of different computing device 102 configurations. This functionality may also be distributed through the system 600, e.g., "over the cloud," implemented using multiple devices, and so on.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system

600. For example, the functionality may be implemented in part on the computing device 602 as well as via the platform 622 that abstracts the functionality of the cloud 620.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving inputs detected using one or more magnetometers, cameras, or microphones;
   determining one or more applications of a plurality of applications that are a target of the inputs, the determining comprising performing a handshake with the applications to determine which of the applications are available to receive events or subscribed to the events;
   converting, by a computing device, the inputs into graphical user interface controls provided by a natural user interface input module for use in a graphical user interface of the one or more applications; and
   exposing the graphical user interface controls to the one or more applications as events via an application programming interface.

2. A method as described in claim 1, wherein the one or more cameras are configured to perform depth sensing.

3. A method as described in claim 1, wherein the inputs are recognizable by the computing device as gestures configured to initiate an operation that corresponds to the graphical user interface controls.

4. A method as described in claim 1, wherein the exposing is performed through execution of an operating system by the computing device.

5. A method as described in claim 1, wherein the handshake is performed between an operating system that performs the determining and the exposing and the one or more applications, the handshake usable by the operating system to determine how and what to send to the one or more applications.

6. A system implemented by a computing device, the system comprising:
   applications that are executable on hardware of the computing device; and
   a module that is implemented at least partially using the hardware of the computing device, the module configured to:
   receive one or more inputs that describe a user interaction that is detected without using touch;
   determine one or more applications of the applications that are a target of the one or more inputs by performing a handshake with the applications to determine which of the applications are available to receive events or subscribed to the events;
   determine which of a plurality of graphical user interface controls provided by the module for use in a graphical user interface of the determined one or more applications is a target of the one or more inputs;
   convert the one or more inputs into one or more events that are consumable by the determined one or more applications; and
   expose the events to the determined one or more applications, each event identifying a respective graphical user interface control that corresponds to the input and an operation to be performed by the determined one or more applications using the respective graphical user interface control.

7. A system as described in claim 6, wherein the module is implemented as part of an operating system of the computing device.

8. A system as described in claim 6, wherein the one or more events are associated with a particular control.

9. A system as described in claim 6, wherein the one or more inputs are detected without using touch by one or more cameras.

10. A system as described in claim 6, wherein the one or more inputs are detected without using touch by one or more microphones.

11. A system as described in claim 6, wherein the module is further configurable to output the one or more inputs to the one or more applications as a raw stream.

12. One or more computer-readable storage media comprising instructions stored thereon that, responsive to execution by a computing device, causes the computing device to implement an operating system configured to expose one or more events via an application programming interface for one or more graphical user interface controls identified by the operating system from inputs received from one or more cameras of the computing device, the controls being provided by a natural user interface input module for use in a graphical user interface of one or more applications, each event identifying a respective graphical user interface control that corresponds to the input and an operation to be performed by the one or more applications using the respective graphical user interface control the one or more events exposed to one or more applications determined to be a target of the one or more inputs by performing a handshake with the applications to determine which of the applications are available to receive events or subscribed to the events.

13. One or more computer-readable storage media as described in claim 12, wherein the inputs describe one or more gestures made by a user that are detected using the one or more cameras without involving touch.

14. One or more computer-readable storage media as described in claim 12, wherein at least one said application is not configured to process the inputs to identify the one or more controls.

* * * * *